United States Patent [19]
Barkel et al.

[11] 3,970,516
[45] July 20, 1976

[54] MULTIPLE FILTER PRESS DIAPHRAGM FORMER

[75] Inventors: Barry M. Barkel, Saline; Stephen M. Collins; William M. Herring, both of Trenton, all of Mich.

[73] Assignee: BASF Wyandotte Corporation, Wyandotte, Mich.

[22] Filed: Dec. 23, 1974

[21] Appl. No.: 535,237

[52] U.S. Cl. .............................. 162/382; 162/218; 162/383
[51] Int. Cl.² ............................................. D21J 3/12
[58] Field of Search ........... 162/153, 382, 387, 218, 162/385, 386, 383, 219; 210/340, 344, 406, 323 R

[56] References Cited
UNITED STATES PATENTS

| | | | |
|---|---|---|---|
| 618,964 | 2/1899 | Theurer | 210/344 |
| 1,372,118 | 3/1921 | Collier | 162/153 |
| 1,848,055 | 3/1932 | Chaplin | 162/382 X |
| 1,855,497 | 4/1932 | Stuart | 162/153 X |
| 2,278,453 | 4/1942 | Kracklauer | 210/340 |
| 3,141,845 | 7/1964 | Nadherny | 210/344 X |
| 3,240,344 | 3/1966 | Hoelscher | 210/340 |
| 3,802,963 | 4/1974 | Lee et al. | 162/387 X |

*Primary Examiner*—Robert L. Lindsay, Jr.
*Assistant Examiner*—Marc L. Caroff
*Attorney, Agent, or Firm*—Bernhard R. Swick; Arnold S. Weintraub; Robert E. Dunn

[57] ABSTRACT

Apparatus for producing a plurality of filter press diaphragms at any one time is disclosed herein. In one form of the invention the apparatus includes a sealed housing containing a plurality of sealed modules fed from a common header, to produce the diaphragms batch-wise. In another form of the invention, an indexing table is employed to produce the diaphragms continuously.

6 Claims, 5 Drawing Figures

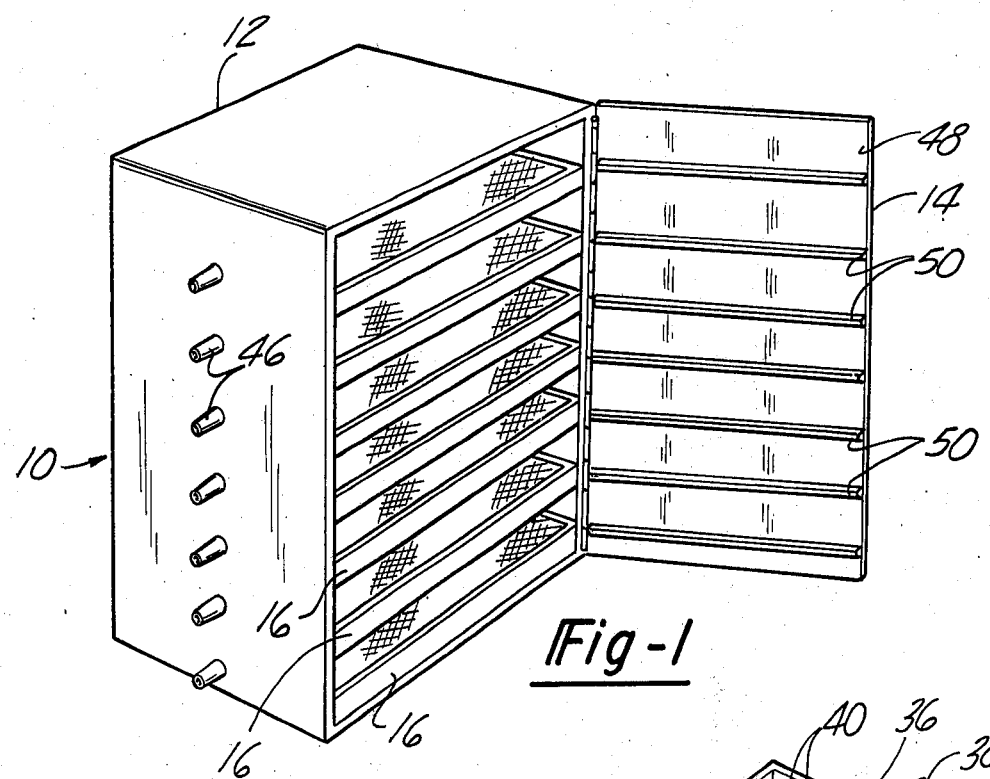
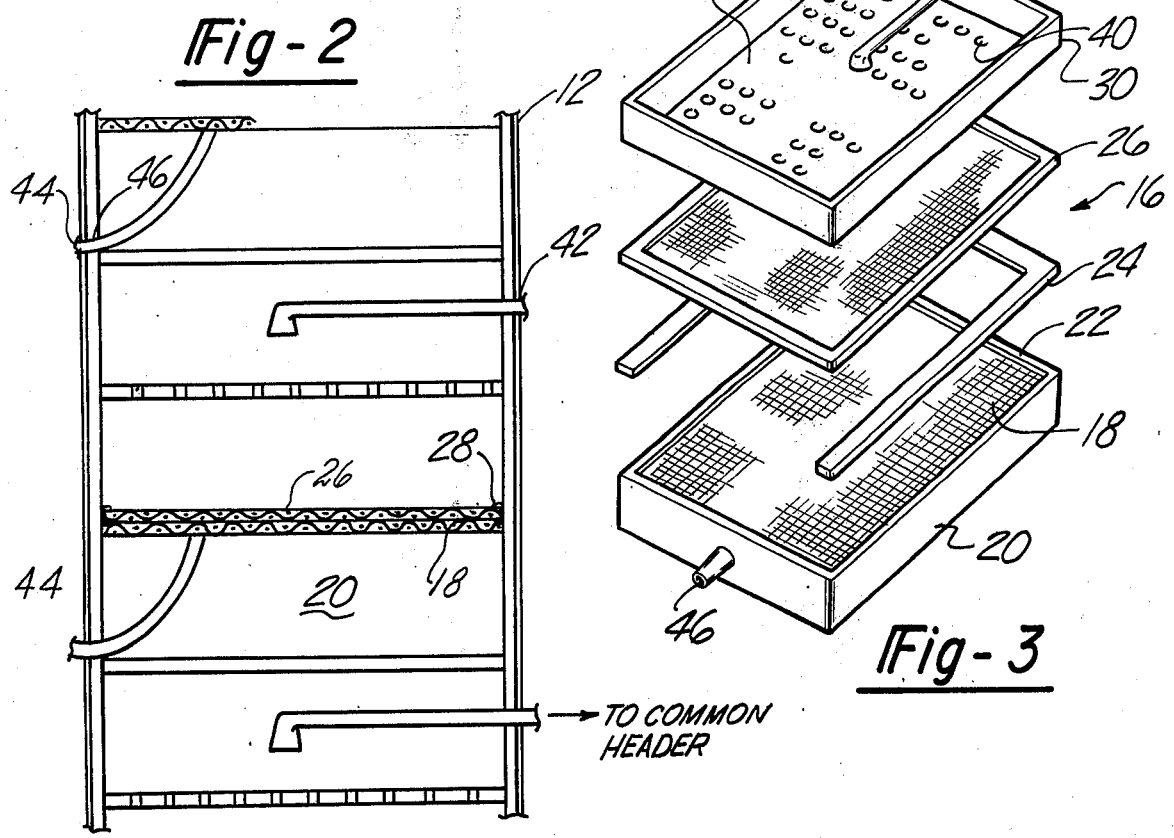

MULTIPLE FILTER PRESS DIAPHRAGM FORMER

BACKGROUND OF THE INVENTION

1. Field of the Invention

The present invention pertains to diaphragms for filter press cells. More particularly, the present invention pertains to the manufacture of diaphragms for filter press cells. Even more particularly, the present invention pertains to the manufacture of a plurality of diaphragms for filter press cells at a single time.

2. Prior Art

The use of diaphragms in composite filter press cells, i.e., bipolar and monopolar, has been well documented heretofore. Such diaphragms, generally, comprise a support surface having deposited thereon a suitable non-conductive material, e.g., asbestos, fibrous material and polymeric material. Conventionally, these diaphragms are made or manufactured on a piecemeal basis, i.e., one at a time.

A plurality of methods have been developed for manufacturing diaphragms on an individual basis. For example, U.S. Pat. No. 1,372,118 teaches a method for producing an asbestos diaphragm wherein an asbestos slurry is deposited on a support screen. The slurry is densified by the use of varying vacuums and superatmospheric pressure. In U.S. Pat. No. 1,855,497 there is disclosed a deposit box for the manufacture of asbestos diaphragms wherein the fingers of the cathode downwardly depend into the interior of the box. Perforated feed pipes traverse the interior of the deposit box for introduction of water thereinto. According to this reference, dry asbestos is placed in the tank and, then, water is introduced thereinto to form a slurry. The cathode is, then, inserted into the box and the water is turned on full. A partial vacuum is then applied to pull off the water. After the water level is normalized, a greater vacuum, then, is applied. The slurry is, then, compacted by the application of a full vacuum across the cathode away from the slurry deposit box.

Other background art is found in U.S. Pat. Nos. 1,910,771 and 3,505,200.

However, it is to be appreciated from the prior art that there has not heretofore been taught the manufacture of a plurality of diaphragms at any one time. It is to this which the present invention is directed.

SUMMARY OF THE INVENTION

The present invention provides a multiple filter press diaphragm former for producing a plurality of such diaphragms at any one time. In a first embodiment of the invention, there is provided a housing having a plurality of diaphragm-forming modules provided therewithin.

Each module comprises a rigid support base having a vacuum box disposed underneath the base. A slurry inlet box is spaced apart from the base. A sealing means is interposed between the inlet box and the base. The sealing means supports a grid or the like upon which the diaphragm material is deposited. The housing is completely sealed to prevent loss of vacuum therewithin.

In another embodiment of the invention there is provided a sealed multi-sectioned housing having indexing means associated therewith. The indexing means shifts the diaphragms through the various sections in the housing to provide apparatus for the continuous manufacture of diaphragms for filter press cells.

In another aspect of the present invention there is provided an asbestos diaphragm for chlor-alkali filter press cells having a pre-determined asbestos thickness. The diaphragm hereof permits more efficient operation of chlor-alkali filter press cells.

For a more complete understanding of the present invention reference is made to the following detailed description and accompanying drawing. In the drawing like reference characters refer to like parts throughout the several views in which:

BRIEF DESCRIPTION OF THE DRAWINGS

FIG. 1 is a perspective view of a first embodiment of a multiple filter press diaphragm former in accordance with the present invention;

FIG. 2 is a broken cross-sectional view through the multiple diaphragm former of FIG. 1;

FIG. 3 is an exploded perspective view of a module of the multiple diaphragm former of FIG. 1;

DETAILED DESCRIPTION OF THE PREFERRED EMBODIMENTS

Figure 4:
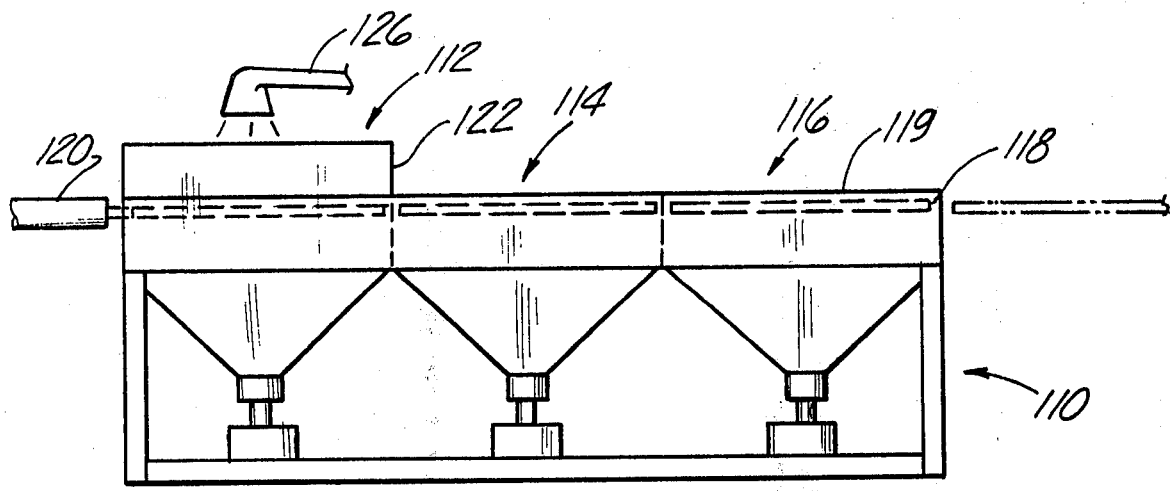
FIG. 4 is a cross-sectional view of an alternate embodiment of the present invention.
Figure 5:
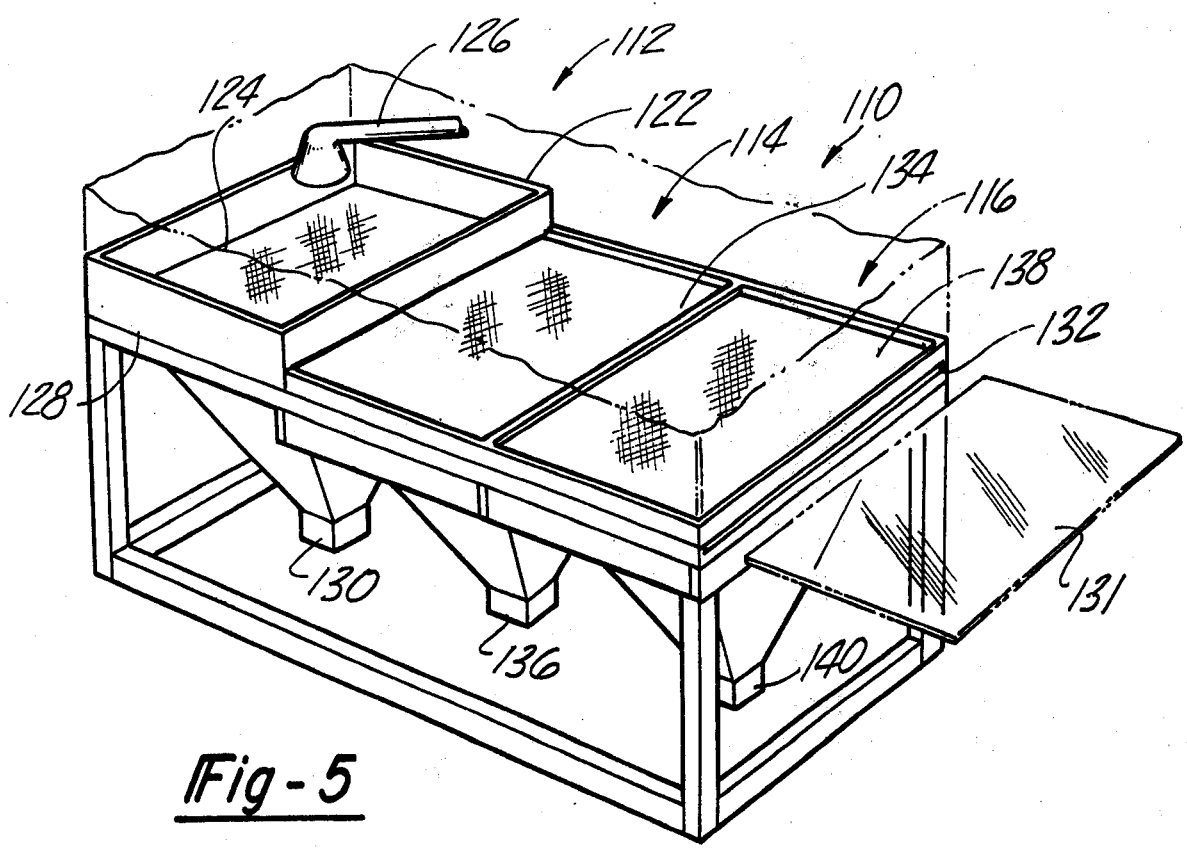
FIG. 5 is a broken, perspective view of the alternate embodiment of FIG. 4.

Now, with reference to the drawing, and in particular, FIGS. 1–3, there is depicted a first embodiment of the present invention. The multiple diaphragm former hereof generally indicated at 10, includes a housing 12 including a rotatable door 14. The housing 12 is formed from any suitable material, and is, preferably, formed from stainless steel.

Disposed within the housing 12 are a plurality of diaphragm-forming modules 16, seven of which are shown. It is to be understood, however, that the invention is not limited to seven modules, but rather contemplates any suitable number of modules which can be effectively and conveniently operated at one time. The modules 16 are analogously constructed. Therefore, for purposes of facilitating an understanding hereof, only one such module will be described.

Each module 16 includes a base support grid or perforated plate 18. Where so formed, the grid 18 is formed from a rigid heavy wire mesh. The grid 18 is permanently seated atop a vacuum box or chamber 20. The vacuum chamber 20 comprises an open-topped member having the grid 18 seated thereon. The chamber 20, as will subsequently be detailed, is used to densify a slurry deposited on a diaphragm support and to collect and draw off excess slurry therefrom.

The chamber 20 is provided with a top peripheral shoulder 22 which is inwardly directed. The shouler 22 defines a seat for the grid 18.

Peripherally extending around the shoulder 22 and seated thereatop is a sealing gasket 24. The sealing gasket 24 abuts the shoulder 22 and defines a seat for a diaphragm support base or screen 26. The gasket 24 is a thin sealing material formed from neoprene, or the like. Preferably, the gasket 24 is a U-shaped gasket affixed to and extending around the interior lateral sides and rear side of the housing 12. In this manner, the gasket 24 defines a track 28 for the support screen 26.

Spaced apart from the gasket 24 is a slurry inlet chamber 30. The chamber 30 is spaced apart from the gasket 24 a pre-determined distance such that the thickness of the slurry to be deposited can be accomodated. The chamber 30 includes a lateral or side wall 32 and a bottom wall 34. The side wall 32 includes an aperture 36. The aperture 36 defines an inlet for a slurry charging means, such as a pipe 38.

The bottom wall 34 is provided with a plurality of apertures 40. The apertures 40 permit a charge of slurry to pass through the bottom wall 34 and onto the screen 26.

The depth of the chamber 30 is determined by the volume of the slurry charge.

In constructing the housing 12, one of the lateral sides thereof is provided with a plurality of apertures 42 which are in registry with the apertures 36 so that the pipes 38 can be inserted therethrough. The apertures 42 are sealed on the exterior of the housing by any suitable means.

The housing side opposite the side having the slurry inlet apertures is provided with a plurality of apertures 44. The apertures 44 define ports for vacuum outlets 46. The vacuum outlets 46 are formed in the vacuum chambers 20 beneath the grid 18.

Each of the slurry inlet pipes 38 extend from a common supply header or a common supply tank (not shown). Likewise, each vacuum outlet 46 is connected to a common header (not shown) for simultaneously drawing a common and co-equal vacuum across each module 16.

In order to effectuate a vacuum tight seal within the housing 12, the interior side 48 of the door 14 has a plurality of sealing gaskets 50 extending thereacross. The gaskets 50 matingly engage the gaskets 24 associated with each of the modules 16.

In preparing a plurality of diaphragms in accordance herewith, a support screen 26 is inserted into the housing into the track 28 of each module 16. The door 14 is, then, closed. A charge of slurry is then fed from the pipes 38 into each inlet chamber 30. Contemporaneous with the slurry charging, a partial vacuum is applied to the undersurface of the support grid 18. This initially densifies the slurry on the support screen 26 and draws off excess slurry. Then, a full vacuum is applied across the grid 18 to fully compact the slurry and to draw off excess slurry. The excess slurry can then be returned to the supply tank.

After the full vacuum is applied, the door is then opened and the prepared diaphragms can be removed by sliding them out of their respective tracks. In this manner a plurality of diaphragms can be prepared simultaneously.

Referring now to FIG. 4, there is depicted therein an alternate embodiment of the present invention. According to this embodiment diaphragms for filter press cells are manufactured continuously. In accordance herewith there is a provided a sealed housing 110 having three sections 112, 114, 116, respectively. Each section or stage carries out a pre-determined function in preparing a diaphragm 118. The stages are continuously formed, such as by elongated table 119, or the like.

The apparatus hereof, also, includes an indexing means 120. The indexing means can comprise any suitable means, such as a hydraulic ram or the like, for shifting the diaphragms from one stage to the next.

The first stage 112 comprises a slurry deposit stage. This stage comprises a slurry inlet chamber 122, formed atop a support grid 124. The chamber 122 is constructed analogously to the inlet chamber 30 and includes a slurry feed supply line 126 and an apertured bottom wall 128 through which the slurry is deposited onto the diaphragm support screen.

Disposed beneath the grid 124 is a vacuum chamber 130. The vacuum chamber 130 includes an evacuation pump for initially depositing an densifying the slurry on the diaphragm support screen.

Interposed between the chamber 122 and 130 is the diaphragm support screen 131. Preferably, the screen is encased within a sealing gasket, such as a continuous track 132 which extends along the length of the table 119.

The edge of the screen 118 is engageable by the ram 120 to shift the screen from one stage to the next.

The second stage 114 comprises a heavy wire screen 134 and which comprises a part of the table 119. The heavy wire screen or grid 134 supports the diaphragm support screen while stationed thereat. The second stage, also, includes a vacuum chamber 136 disposed beneath the grid 134 and in communication therewith. At the second stage 114 a heavy vacuum is applied to the wet slurry deposited on the diaphragm support screen. The vacuum applied via the chamber 136 further densifies the slurry and collects the excess slurry.

The third stage 116 is constructed analogously to the second and includes a heavy support grid 138 and an evacuation chamber 140 disposed underneath the grid and in communication therewith. At the third stage, the diaphragm is dried out by the application of a medium vacuum thereto.

It is, thus, seen that in accordance with this embodiment there is provided a stage-wise apparatus and process for the preparation of diaphragms in a unitary housing having first, second and third stages wherein a slurry is deposited, compacted and, then, dried. In practicing this embodiment, after the screen has the slurry deposited thereon at the first stage, it is then indexed to the second stage by the means 120. A new screen is then inserted into the track at the first stage to deposit a slurry thereon. Then, as this new screen is shifted to the second stage, such movement causes the first screen to shift to the second stage and so forth, to thereby provide a continuous process for diaphragm manufacturing. Of course, independent indexing means for each stage can be provided herein.

The diaphragms produced by the present invention are adapted for use in filter press cells, either bipolar or monopolar. Thus, the support screens, therefor, can comprise any suitable material including a fine wire mesh and the like. Furthermore, the slurries can comprise any suitable material including fibers, polymers, asbestos and the like. It is also, noteworthy, that both embodiments of the present invention define a confined system. This is especially important with the preparation of asbestos diaphragms. The present confined system greatly reduces the possibility of breathing asbestos fibers and the now documented health hazards accompanied thereby.

It should, also, be noted with respect hereto that each module or stage can be suitably equipped with individual vacuum control shut-off valves; slurry metering means and the like. The unit can, also, be utilized for heat treatment of diaphragms by providing proper insulation and an external heat source.

As hereinbefore noted, the present invention is amenable to the manufacture of diaphragms for filter press cells, generally. The present invention has particular utility in the manufacture of chlor-alkali filter press cell asbestos diaphragms. Because of the inherent controls incorporated into the instant apparatus it is possible to create more efficient and improved diaphragms. Thus, in accordance herewith there is provided asbestos diaphragms for chlor-alkali filter press cells, such as described in copending U.S. patent application Ser. No. 535,322, filed Dec. 23, 1974, for "ASBESTOS DIAPHRAGMS FOR FILTER PRESS CELLS", the disclosure of which is hereby incorporated by reference.

As disclosed in the copending application, in preparing such diaphragms, into each module or first stage is charged 15 gallons of a weak cell caustic liquor slurry containing about 2%, by weight, of asbestos. The charge is introduced into the inlet chamber and a vacuum of about 3 to 6 inches of mercury is applied across the grid. This vacuum is maintained for about 1 to 5 minutes. Then, there is applied to the diaphragm support screen a high vacuum of about 24 to 28 inches of mercury by either shifting the screen to the second stage or by altering the vacuum in the vacuum chamber. This high vacuum is attained in about 2 to 5 minutes after the second stage is evacuated to about 3 inches of mercury. Finally, a medium vacuum of about 15 to 20 inches of mercury is applied to the diaphragm. The medium vacuum is maintained for about five to fifteen minutes to ensure drying. This drying is achieved by either indexing the diaphragm to the third stage or by altering the vacuum in the vacuum chamber. Thus, within about 8 to 25 minutes not including the time required to break the vacuum, index and re-evacuate there is obtained a diaphragm of the predetermined thickness.

It is apparent from the preceding that there has been described a multiple of diaphragm former for producing diaphragms for filter press cells in an efficient and environmentally safe manner, and which provides improved diaphragms.

Having, thus, described the invention, what is claimed is:

1. A multiple filter press diaphragm former, comprising:
   a. a housing,
   b. at least one slurry inlet chamber disposed in the housing for issuing a slurry onto a diaphragm support base,
   c. a rigid support screen spaced apart from and provided beneath the slurry inlet chamber, such that a diaphragm support base is accomodated between the slurry inlet chamber and the support screen,
   d. at least one evacuation chamber disposed beneath the support screen,
   e. means for introducing a slurry into the inlet chamber,
   f. vacuum means for applying varying vacuums across the support screen through the evacuation chamber to densify the slurry issuing onto a diaphragm support base, and
   g. a sealing gasket abutting the support screen and disposed between the support screen and the inlet chamber, the gasket defining a track for slidingly receiving a diaphragm support base.

2. The diaphragm former of claim 1 wherein the slurry inlet chamber comprises a bottom wall having a plurality of apertures provided therein.

3. The diaphragm former of claim 1 wherein the inlet chamber, the support screen and the evacuation chamber cooperate to define a module, the housing having a plurality of modules disposed therewithin, each module having slurry introducing means and vacuum means associated therewith.

4. The diaphragm former of claim 3 which further comprises a sealing gasket for each module, the sealing gasket abutting the support screen and disposed between the support screen and inlet chamber.

5. The diaphragm former of claim 4 wherein each sealing gasket defines a track for slidingly receiving a diaphragm support base.

6. The diaphragm former of claim 1 which further comprises:
   a. at least three evacuation chambers,
   b. at least three support screens,
   c. indexing means, and
wherein the slurry inlet chamber, a first support screen and a first evacuation chamber defines a first stage; a second support screen and a second evacuation chamber defines a second stage; a third support screen and a third evacuation chamber defines a third stage, and indexing means transfers a diaphragm support base between the stages.

* * * * *